United States Patent
Decasa, Jr. et al.

(10) Patent No.: US 11,430,287 B2
(45) Date of Patent: *Aug. 30, 2022

(54) SYSTEMS AND METHODS FOR SIMULATING PLAYER BEHAVIOR USING ONE OR MORE BOTS DURING A WAGERING GAME

(71) Applicant: Aristocrat Technologies Australia Pty Limited, North Ryde (AU)

(72) Inventors: Rogelio Decasa, Jr., Renton, WA (US); Derek Hall, Round Rock, TX (US)

(73) Assignee: Aristocrat Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 17/191,960

(22) Filed: Mar. 4, 2021

(65) Prior Publication Data

US 2021/0192890 A1 Jun. 24, 2021

Related U.S. Application Data

(63) Continuation of application No. 16/584,227, filed on Sep. 26, 2019, now Pat. No. 10,970,957.

(51) Int. Cl.
  *G07F 17/32* (2006.01)
  *G06F 3/01* (2006.01)
  *G06N 3/00* (2006.01)
  *G06F 3/04847* (2022.01)

(52) U.S. Cl.
  CPC .......... *G07F 17/3211* (2013.01); *G06F 3/011* (2013.01); *G06F 3/04847* (2013.01); *G06N 3/006* (2013.01); *G07F 17/3244* (2013.01); *G07F 17/3272* (2013.01)

(58) Field of Classification Search
  CPC ............ G07F 17/3211; G07F 17/3244; G07F 17/3272; G06F 3/04847; G06F 3/011; G06N 3/006
  See application file for complete search history.

(56) References Cited

U.S. PATENT DOCUMENTS

| | | |
|---|---|---|
| 7,857,693 B1 | 12/2010 | Johnson |
| 9,251,645 B2 | 2/2016 | Barclay |
| 9,454,873 B2 | 9/2016 | Rowe |
| 9,875,610 B2 | 1/2018 | Frenkel |
| 10,068,418 B2 | 9/2018 | Thomas |
| 10,410,471 B2 | 9/2019 | Gagner |
| 2004/0229671 A1 | 11/2004 | Stronach |

(Continued)

OTHER PUBLICATIONS

International Search Report and Written Opinion issued in PCT/US2020/027756, dated Jul. 6, 2020, 12 pages.

(Continued)

*Primary Examiner* — Seng H Lim
(74) *Attorney, Agent, or Firm* — Armstrong Teasdale LLP

(57) ABSTRACT

An electronic gaming machine includes a display device and a processor configured to execute instructions stored in a memory, which when executed, cause the processor to at least initiate a multiplayer game, select at least one bot of a plurality of bots from a bot selection table associated with each bot of the plurality of bots, each bot simulating a player behavior, determine an entry time for at least one bot of the plurality of bots in the simulated multiplayer game, and control the display device to simulate a selection, by the at least one bot, of at least one selectable item at the determined entry time.

17 Claims, 14 Drawing Sheets

(56) References Cited

U.S. PATENT DOCUMENTS

| | | |
|---|---|---|
| 2004/0235542 A1 | 11/2004 | Stronach |
| 2006/0131810 A1 | 6/2006 | Nicely |
| 2008/0039170 A1 | 2/2008 | Ogilvie |
| 2011/0190066 A1 | 8/2011 | Barclay |
| 2012/0123570 A1 | 5/2012 | Guinn |
| 2013/0040730 A1 | 2/2013 | Barclay |
| 2013/0303259 A1 | 11/2013 | Saunders |
| 2014/0073413 A1 | 3/2014 | Barclay |
| 2018/0225930 A1 | 8/2018 | Efremescu |
| 2018/0268644 A1 | 9/2018 | Cong |
| 2018/0300414 A1 | 10/2018 | Chen |
| 2019/0019370 A1 | 1/2019 | Ono |
| 2019/0066446 A1 | 2/2019 | Mariscal |
| 2019/0102995 A1 | 4/2019 | Meyer |
| 2019/0122491 A1 | 4/2019 | Rowe |
| 2019/0130696 A1 | 5/2019 | Compton |
| 2019/0244472 A1 | 8/2019 | Efremescu |

OTHER PUBLICATIONS

Notice of Alowance dated Jan. 27, 2021 for U.S. Appl. No. 16/584,227 (pp. 1-8).

CONTINUED ON FIG.6B

BOT SELECTION TABLE

| SET # | WEIGHT | PROB | 1ST BOT | 2ND BOT | 3RD BOT | 4TH BOT | 5TH BOT | 6TH BOT | 7TH BOT | 8TH BOT | 9TH BOT |
|---|---|---|---|---|---|---|---|---|---|---|---|
| 1 | 100 | 19.048% | 1 | 2 | 3 | 4 | 5 | 6 | 7 | 8 | 9 |
| 2 | 90 | 17.143% | 1 | 2 | 3 | 5 | 6 | 8 | 9 | 10 | 12 |
| 3 | 80 | 15.238% | 1 | 3 | 4 | 7 | 8 | 9 | 10 | 11 | 12 |
| 4 | 70 | 13.333% | 1 | 2 | 5 | 6 | 7 | 8 | 9 | 10 | 11 |
| 5 | 60 | 11.429% | 1 | 3 | 4 | 5 | 6 | 7 | 10 | 10 | 12 |
| 6 | 50 | 9.524% | 2 | 4 | 5 | 7 | 8 | 9 | 10 | 11 | 12 |
| 7 | 30 | 5.714% | 2 | 3 | 4 | 6 | 7 | 8 | 9 | 10 | 11 |
| 8 | 25 | 4.762% | 2 | 3 | 4 | 5 | 6 | 7 | 10 | 11 | 12 |
| 9 | 15 | 2.857% | 3 | 5 | 6 | 7 | 8 | 9 | 10 | 11 | 12 |
| 10 | 5 | 0.952% | 4 | 5 | 6 | 7 | 8 | 9 | 10 | 11 | 12 |
| | 525 | 100.000% | | | | | | | | | |

BOT NUMBERS

| BOT SELECTION WEIGHTS (USED WHEN CHOOSING TO ASSIGN A BOT TO A SPOT/TIMEPOINT) | | | | | | | | | |
|---|---|---|---|---|---|---|---|---|---|
| 1ST BOT | 2ND BOT | 3RD BOT | 4TH BOT | 5TH BOT | 6TH BOT | 7TH BOT | 8TH BOT | 9TH BOT | TOTAL WEIGHT |
| 100 | 95 | 105 | 75 | 72 | 50 | 30 | 30 | 30 | 587 |
| 50 | 60 | 80 | 100 | 125 | 100 | 60 | 50 | 40 | 665 |
| 30 | 30 | 30 | 50 | 72 | 75 | 105 | 95 | 100 | 587 |
| 100 | 95 | 105 | 75 | 72 | 50 | 30 | 30 | 30 | 587 |
| 50 | 60 | 80 | 100 | 125 | 100 | 60 | 50 | 40 | 665 |
| 30 | 30 | 30 | 50 | 72 | 75 | 105 | 95 | 100 | 587 |
| 100 | 95 | 105 | 75 | 72 | 50 | 30 | 30 | 30 | 587 |
| 50 | 60 | 80 | 100 | 120 | 100 | 60 | 50 | 40 | 665 |
| 30 | 30 | 30 | 50 | 72 | 75 | 105 | 95 | 100 | 587 |
| 100 | 95 | 105 | 75 | 72 | 50 | 30 | 30 | 30 | 587 |

CONTINUED FROM FIG.6A

FIG.7B

NEW INITIAL ENTRIES TABLE

| #INITIAL ENTRIES | WEIGHT | PROB |
|---|---|---|
| 0 | 300 | 49.587% |
| 1 | 200 | 33.058% |
| 2 | 50 | 8.264% |
| 3 | 30 | 4.959% |
| 4 | 20 | 3.306 |
| 5 | 5 | 0.826% |
| | 605 | 100.000% |

TIMED ENTRY DISTRIBUTION TABLE  **NOTE THAT TIMEPOINTS GENERATED ARE FROM THE LAST BOT ENTRY PLACEMENT

| # | WEIGHT | PROB | DIST TYPE | MIN(SEC) | MAX(SEC) | NOTES |
|---|---|---|---|---|---|---|
| 1 | 100 | 22.883% | UNIFORM | 5 | 40 | |
| 2 | 95 | 21.739% | UNIFORM | 8 | 55 | |
| 3 | 80 | 18.307% | UNIFORM | 3 | 68 | |
| 4 | 72 | 16.476% | UNIFORM | 10 | 85 | |
| 5 | 50 | 11.442% | UNIFORM | 7 | 102 | |
| 6 | 30 | 6.865% | UNIFORM | 5 | 35 | |
| 7 | 10 | 2.288% | UNIFORM | 3 | 45 | |
| | 437 | 100.000% | | | | |

FIG. 9

SYSTEMS AND METHODS FOR SIMULATING PLAYER BEHAVIOR USING ONE OR MORE BOTS DURING A WAGERING GAME

PRIORITY

This application is a Continuation of, and claims priority to, U.S. patent application Ser. No. 16/584,227, filed Sep. 26, 2019, the disclosure of which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Although some known wagering games permit play by a plurality of players, traditionally, each player is an actual human player participating in the wagering game. Stated another way, conventional wagering games do not permit the introduction of one or more simulated players, such as one or more "bots," during gameplay. In addition, conventional wagering games do not permit simulation of player behavior based upon actual or empirical data and/or using machine learning or an artificial intelligence.

SUMMARY

In one aspect, a tangible, non-transitory, computer-readable storage medium is provided. The storage medium has instructions stored thereon, which when executed by a processor, cause the processor to at least initiate a simulated multiplayer game, and control a display device to display plurality of selectable items. When executed, the instructions also cause the processor to select a plurality of bots from a bot selection table, where the bot selection table includes a bot selection weight associated with each bot of the plurality of bots, and where each bot simulates a player behavior. In addition, the instructions may cause the processor to determine, from a timed entry distribution table, an entry time for at least one bot of the plurality of bots in the simulated multiplayer game, and control the display device to simulate a selection, by the at least one bot, of at least one selectable item at the determined entry time.

In another aspect, a method is provided. The method includes initiating, by a processor, a simulated multiplayer game, and controlling, by the processor a display device to display a plurality of selectable items. The method also includes selecting, by the processor, a plurality of bots from a bot selection table, where the bot selection table includes a bot selection weight associated with each bot of the plurality of bots, and where each bot simulates a player behavior. The method also includes determining, by the processor and from a timed entry distribution table, an entry time for at least one bot of the plurality of bots in the simulated multiplayer game, and controlling, by the processor, the display device to simulate a selection, by the at least one bot, of at least one selectable item at the determined entry time.

In yet another aspect, an electronic gaming machine is provided. The electronic gaming machine includes a display device, a memory, and a processor configured to execute instructions stored in the memory, which when executed, cause the processor to at least initiate a simulated multiplayer game, and control a display device to display a plurality of selectable items. When executed, the instructions also cause the processor to select a plurality of bots from a bot selection table, where the bot selection table includes a bot selection weight associated with each bot of the plurality of bots, and where each bot simulates a player behavior. In addition, the instructions may cause the processor to determine, from a timed entry distribution table, an entry time for at least one bot of the plurality of bots in the simulated multiplayer game, and control the display device to simulate a selection, by the at least one bot, of at least one selectable item at the determined entry time.

BRIEF DESCRIPTION OF THE DRAWINGS

FIG. 7A shows a first portion of a bot selection table that may be used to determine one or more bots that will participate in the wagering game;

FIG. 7B shows a second portion of the bot selection table that begins in FIG. 7A;

FIG. 9 shows a timed entry distribution table that may be used to determine a time that one or more bots selected to participate in the wagering game will claim one or more claimable property icons;

DETAILED DESCRIPTION

Embodiments of the present disclosure provide systems and methods for introducing a plurality of simulated players, or "bots," during an electronic wagering game. Bot behaviors are simulated to approximate actual player behavior. For example, one or more tables that define different aspects of bot behavior may be used during the wagering game to determine a behavior of each bot. Thus, for example, if actual human players are unavailable, a player can still be able to play a simulated multiplayer wagering game without actually engaging in a multiplayer wagering game played by a plurality of human players. Rather, one or more bots may be introduced to simulate player behavior and to simulate a multiplayer wagering game. To insure that players realize that they are playing with bots and not human players, the game can provide a clear indication that the players are bots.

Figure 1:
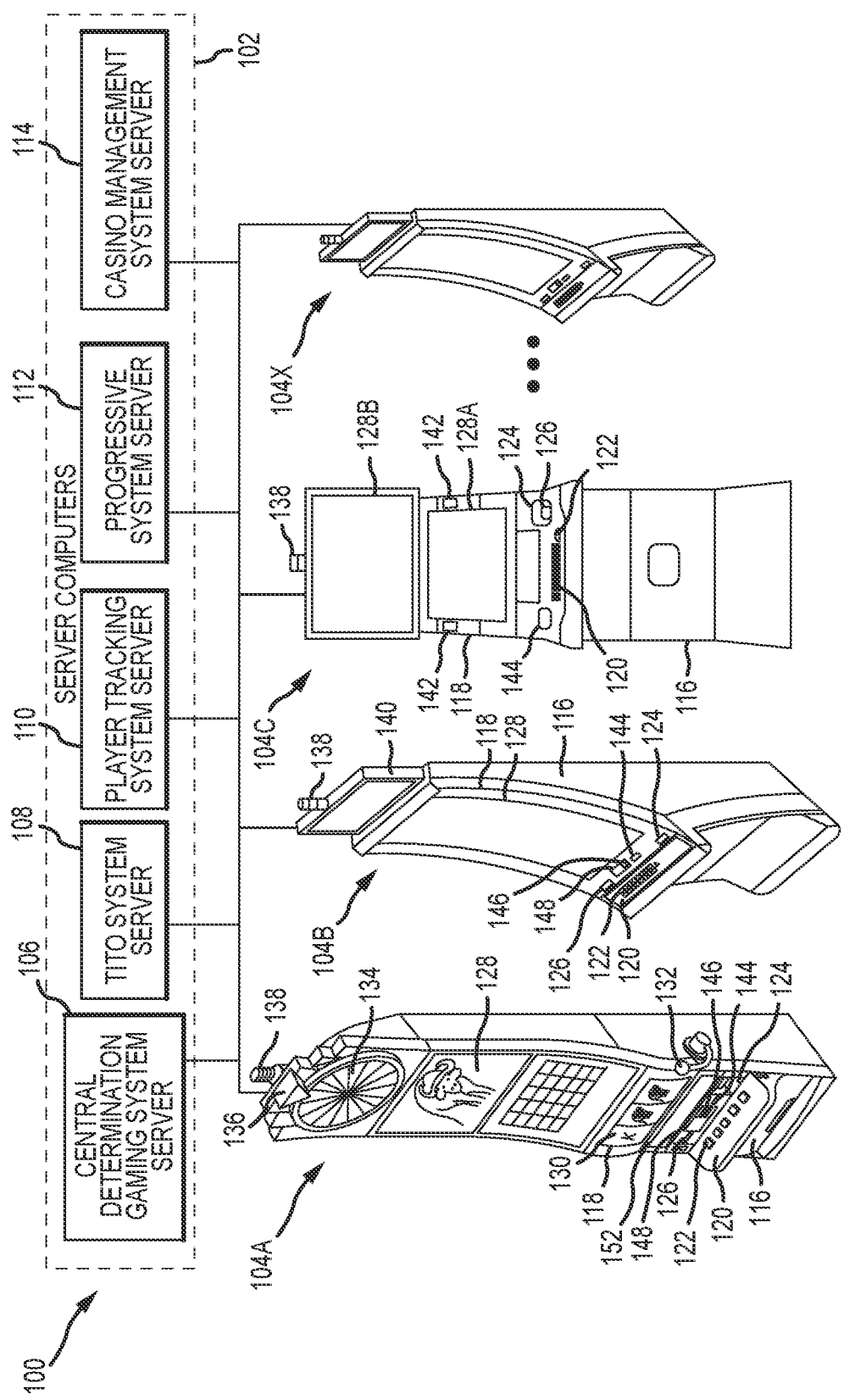
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, a personal computer or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
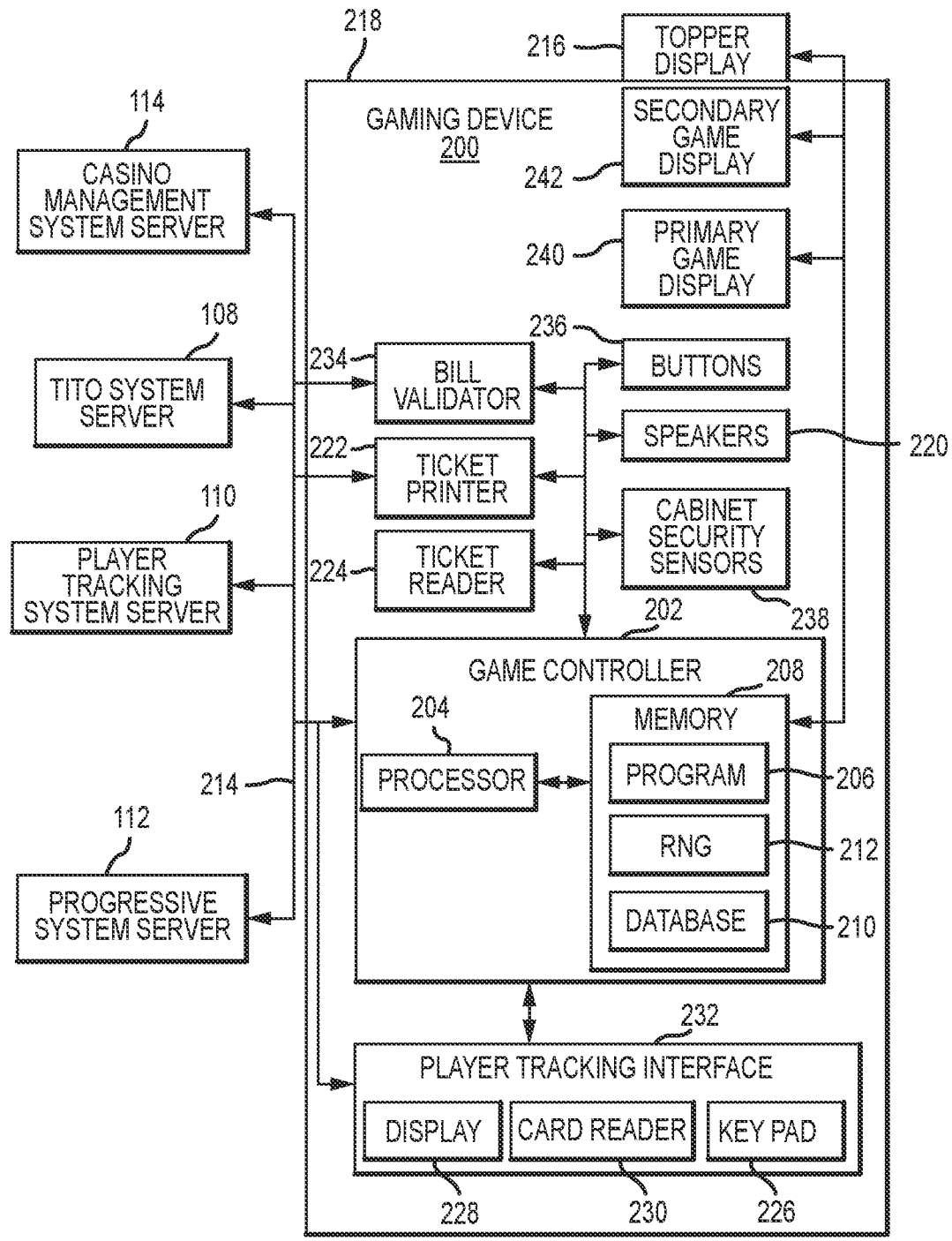
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards and/or determining one or more Bingo numbers for a Bingo number call. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS° system manufactured by Aristocrat° Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
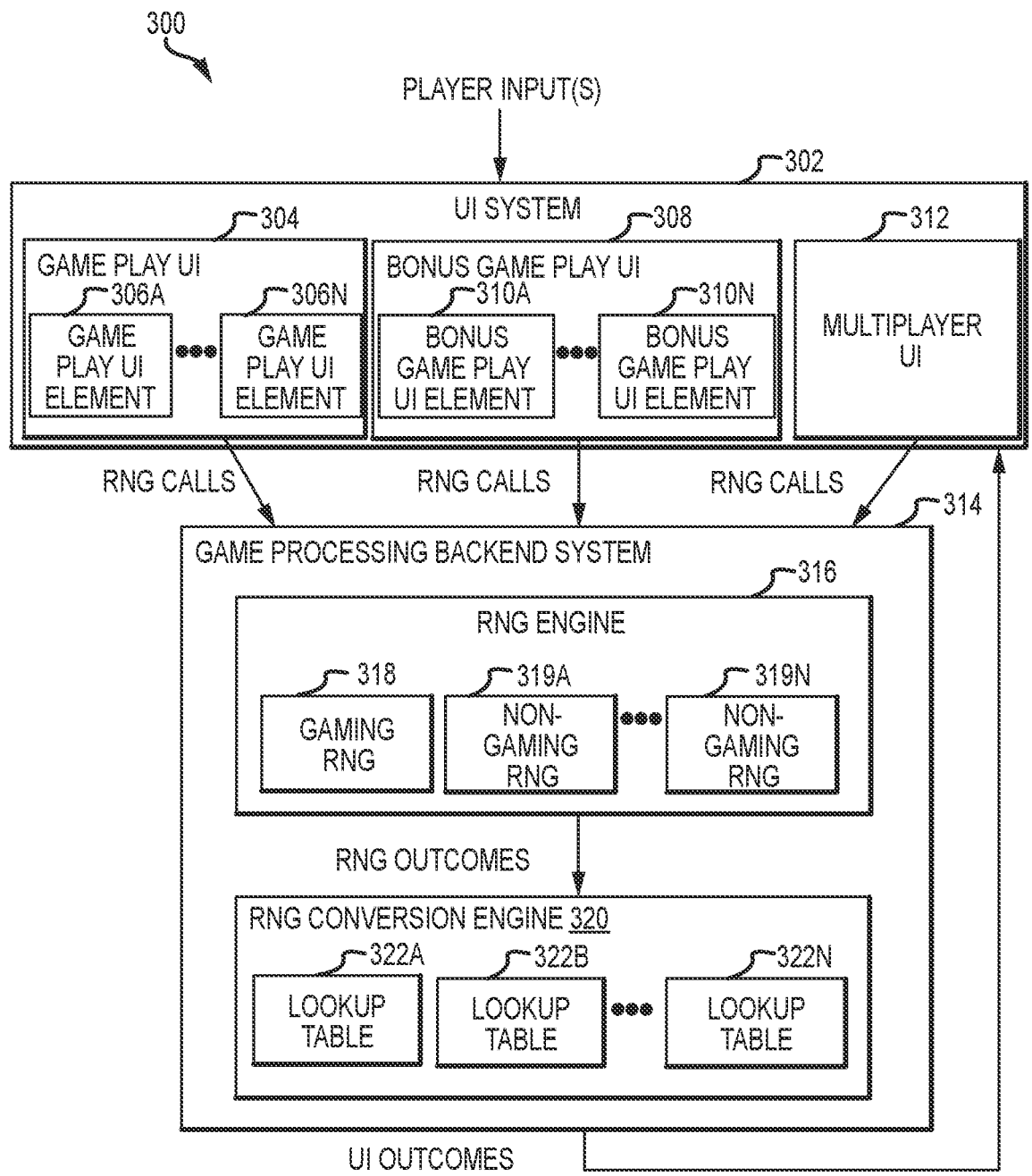
FIG. 3 is illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 304, and one or more multiplayer UIs 306, where each UI type includes one or more mechanical UIs and/or graphical UIs (GUIs). In other words, game play UI 304, bonus game play UI 304, and the multiplayer UI 304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Figure 4:
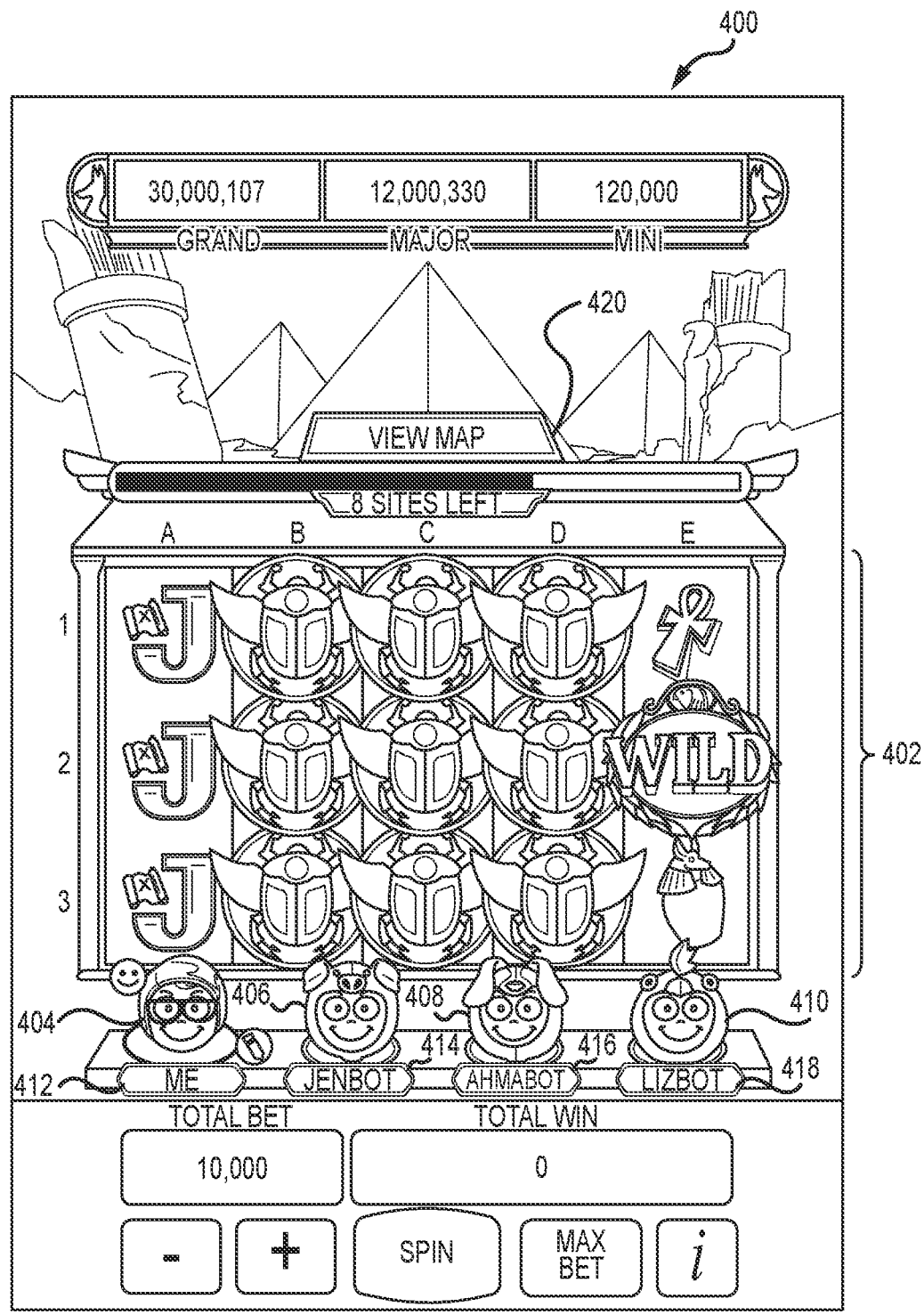
FIG. 4 is a screenshot of a simulating multiplayer wagering game played on an EGM shown in FIG. 1-FIG. 3, in which the wagering game includes a base game played on a plurality of reels and a bonus game that includes a map.

FIG. 4 is a screenshot of a base game of a simulated multiplayer wagering game 400 played on an EGM 104A-104X. More particularly, wagering game 400 may facilitate play by one human player and one or more simulated players or "bot players." For simplicity, bot players may also be referred to herein simply as "bots." Accordingly, as used herein, a "bot player" or "bot" may refer to a simulated player (e.g., rather than a human player) of wagering game 400. In the example embodiment, the base game of wagering game 400 includes a matrix of symbol positions 402 (or simply "matrix" 402).

The symbol positions of matrix 402 are arranged in a plurality of rows and a plurality of columns. More particularly, in the example embodiment, matrix 402 is a 3×5 matrix having three rows and five columns. However, in other embodiments, matrix 402 may be any size (e.g., 2×2, 3×3, 4×4, 10×10, etc.) Further, in other embodiments, the symbol positions may be arranged in non-rectangular matrices, such as in a 3×4×5×4×3 configuration.

Each row of matrix 402 is designated by a row number (e.g., "1," "2," "3," etc.) Each column of matrix 402 is designated by a column letter (e.g., "A," "B," "C," "D," "E," etc.) As a result, and in the example embodiment, matrix 402 includes fifteen symbol positions. However, a number of symbol positions in matrix 402 may vary depending upon a number of rows and columns displayed in matrix 402. In some embodiments, matrix 402 may be replaced by one or more mechanical reels, and the embodiments described herein work equally well with mechanical reels as with matrix 402.

Each symbol position of matrix 402 may therefore be designated by a symbol position identifier comprising a row number (e.g., "1," "2," "3," etc.) and a column letter (e.g., "A," "B," "C," "D," "E," etc.) For example, the upper-leftmost symbol position, occurring at the intersection of row 1 and column A, may be designated by the symbol position identifier "1A."

As described herein, during play of wagering game 400, symbols may be selected (e.g., such as from a plurality of reel strips) and displayed in the symbol positions of each column of symbols within matrix 402. Although not central to an understanding of the present disclosure, a "reel strip" may include a plurality of symbols arranged in a vertical column. To display symbols from a reel strip in a column of symbol positions within matrix 402, processor 204 may simulate spinning and stopping of a reel strip within one or more symbol positions and/or one or more columns of matrix 402. Here again, however, mechanical reels having physical reel strips may be used as well.

When a respective reel strip is simulated to stop within an associated column, one or more symbols may be randomly displayed from the reel strip in the symbol positions of the column. Processor 204 may use a random number generator to generate a random number to determine the reel stop position of each of the reels. For example, one or more random numbers may be provided by RNG engine 316, as described herein. The symbols displayed after spinning and stopping each reel strip in a respective column of matrix 402 may be referred to herein as a "reel outcome" or a "reel game outcome." Thus, a rotation and stopping of a plurality of reel strips may be simulated by processor 204 within the columns of matrix 402 to cause a reel outcome, including a plurality of symbols, to be displayed from the plurality of reel strips within the columns of matrix 402.

It will also be appreciated that symbols may be displayed in matrix 402 in response to one or more player wagers and/or, in some cases, when one or more free spins are awarded. Symbols may, in addition, be selected randomly, such as based upon a random number provided by RNG 212, RNG engine 316, and/or, in at least some embodiments, based upon one or more bingo game outcomes.

In the example embodiment, wagering game 400 also includes a plurality of player positions, such as a first player position 404, a second player position 406, a third player position 408, and a fourth player position 410. In each player position 404-410, a player (e.g., human player) or a bot player is displayed. Specifically, a human player 412 ("Me") is displayed in first player position, 404, a first bot player 414 ("JenBot") is displayed in second player position 406, a second bot player 416 ("AhmaBot") is displayed in third player position 408, and a third bot player 418 ("LizBot") is displayed in fourth player position 410. Although one human player 412 and three bot players 414-418 are shown in the example of FIG. 4, it will be appreciated that any suitable number of human players 412 and bot players 414-418 may participate, as described herein, in wagering game 400. Stated another way, bots other than and/or including bot players 414-418 may also participate in wagering game 400.

For convenience, human player 412 and bot players 414-418 may be collectively referred to herein as "players" 412-418. In addition, as described above, bot players 414-418 may in some instances simply be referred to as "bots."

Wagering game 400 may also include a map 420. Map 420 may be used during a bonus game of wagering game 400, as described below. During the base game, map 420 may be displayed in a compact or "rolled" configuration, whereby the player is made aware of the presence of map 420 but not able to view the contents of map 420. In another embodiment, map 420 is displayed in its entirety, such as on secondary display 242 and/or in another suitable location.

During wagering game 400, a player may place a wager, which may cause the base game to be initiated. In the base game, processor 204 may control a display device, such as primary display 240, to simulate spinning and stopping of a plurality of reel strips (as described above), and symbols to be displayed in each symbol position of matrix 402.

The symbols displayed in matrix 402 may be evaluated, such as by processor 204, to determine whether there are any winning combinations of symbols. Specifically, the symbols displayed in matrix 402 may be compared to one or more winning symbol combinations in a paytable of winning symbol combinations, and if any winning symbol combinations are displayed, an award associated with each combination may be added to a player's credit balance.

In addition, the symbols displayed in matrix 402 may be evaluated to determine whether any designated symbols are displayed. As used herein, a "designated symbol" may include any symbol capable of triggering or causing initiation of the bonus game (individually or in combination with other designated symbols). For example, in FIG. 4, a plurality of designated symbols appear at symbol positions "1B" —"1D," "2B" —"2D," and "3B" —"3D." In the example embodiment, the plurality of designated symbols are "scarab" symbols.

However, it will be appreciated that any suitable symbol may be used to trigger the bonus game as well as that any desired combination of designated symbols may cause initiation of the bonus game.

As described briefly above, the bonus game of wagering game 400 is a simulated multiplayer bonus game, in which one human player participates, and in which one or more bots 414-418 (typically between one and ten bots) participate. In addition, in some embodiments, several human players 412 may participate in wagering game 400. That is, in at least some embodiments, wagering game accommodates participation by one or more human players 412 and one or more bots 414-418.

Figure 5:
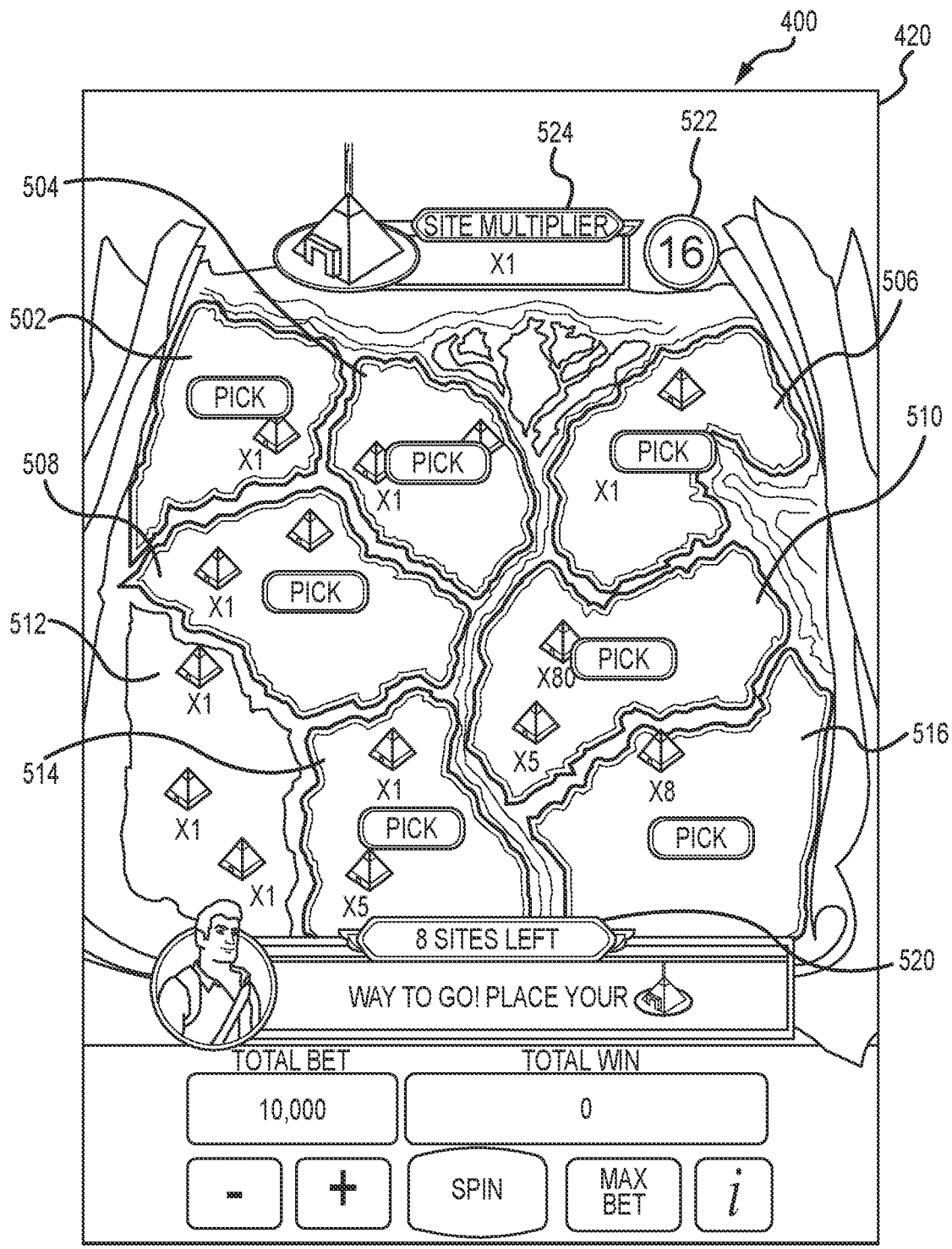
FIG. 5 is a screenshot of the map of the wagering game shown in FIG. 4.

FIG. 5 is a screenshot of a bonus game of wagering game 400. More particularly, as shown, during the bonus game, map 420 is fully displayed, such as by unfurling or unrolling the partial version of map 420 displayed during the base game. In the example embodiment, map 420 includes a plurality of regions, each of which includes one or more claimable property icons. Although claimable property icons are primarily described herein, it will be appreciated that any other suitable item or choice may be presented for selection by a player or a bot. Accordingly, as used herein, the term "selectable item" may include any item, icon, or choice that a player and/or a bot may select during play of wagering game 400, where claimable property icons are one example of a selectable item. In the example of FIG. 5, map 420 includes a first region 502, a second region 504, a third region 506, a fourth region 508, a fifth region 510, a sixth region 512, a seventh region 514, and an eighth region 516.

As used herein, a "claimable property icon" may refer to any identifier or icon associated with a site, a property, or another claimable or player selectable location within a region 502-516 on map 420. In some cases, for simplicity," claimable property icons may be referred to as "property icons" or "icons." As described herein, in the example embodiment, claimable property icons may be represented by pyramids or other building structures.

In turn, each region 502-516 includes a group of claimable property icons, which may be hidden until selection of a region by players 412-418 (as described herein). Thus, in the example of FIG. 5, each region 502-516 is player selectable (e.g., by human player 412 and/or by bots 414-418) to "claim" a claimable property icon within the region 502-516.

Accordingly, as used herein, a claimable property icon may be "claimed" when a player 412-418 selects a region, whereupon a claimable property icon from the selected region 502-516 may be assigned to the player 412-418 for the duration of the bonus game. When a claimable property icon is assigned to a player 412-418, no other player 412-418 may claim the icon for the duration of the bonus game. That is, the claimable property icon belongs to the selecting player 412-418. Although players 412-418 select regions 502-516 in the example of FIG. 5, in some embodiments, each claimable property icon may be displayed and individually selectable by a player 412-418 as well.

In the example embodiment, a number of claimable property icons remaining to be claimed (i.e., "unclaimed" claimable property icons) may be displayed in a first meter 520. In addition, a timer 522 may displayed. Timer 522 counts down from an initial number of seconds (e.g., 30 seconds), giving the player 412-418 a limited amount of time to select a region 502-516. Moreover, in at least some embodiments, a second meter 524 displays a site multiplier associated with a player 412-418. For example, in the example of FIG. 5, control of selection of a region 502-516 (and thus a claimable property icon) may be passed from player to player on a turn by turn basis and/or bots may claim icons based upon timed entry points (as described below) as human player 412 plays wagering game 400. In either case, icons are claimed by players 412-418, and the site multiplier associated with the player may be displayed in the second meter 524.

In the example of FIG. 5, seventeen claimable property icons have already been claimed. Each claimed icon may be illustrated as a colored pyramid in its respective region 502-516. In at least some embodiments, a color of each claimed icon may correspond to a color associated with the player 412-418 that claimed the icon. For example, in at least one embodiment, icons claimed by a player 412-418 may be colored gold, red, orange, yellow, green, blue, indigo, violet, etc. to correspond to a color associated with the player 412-418 as may be shown in player position 404-410. Other methods of indicating the association of a claimed icon with a player or bot are of course possible.

Figure 6:
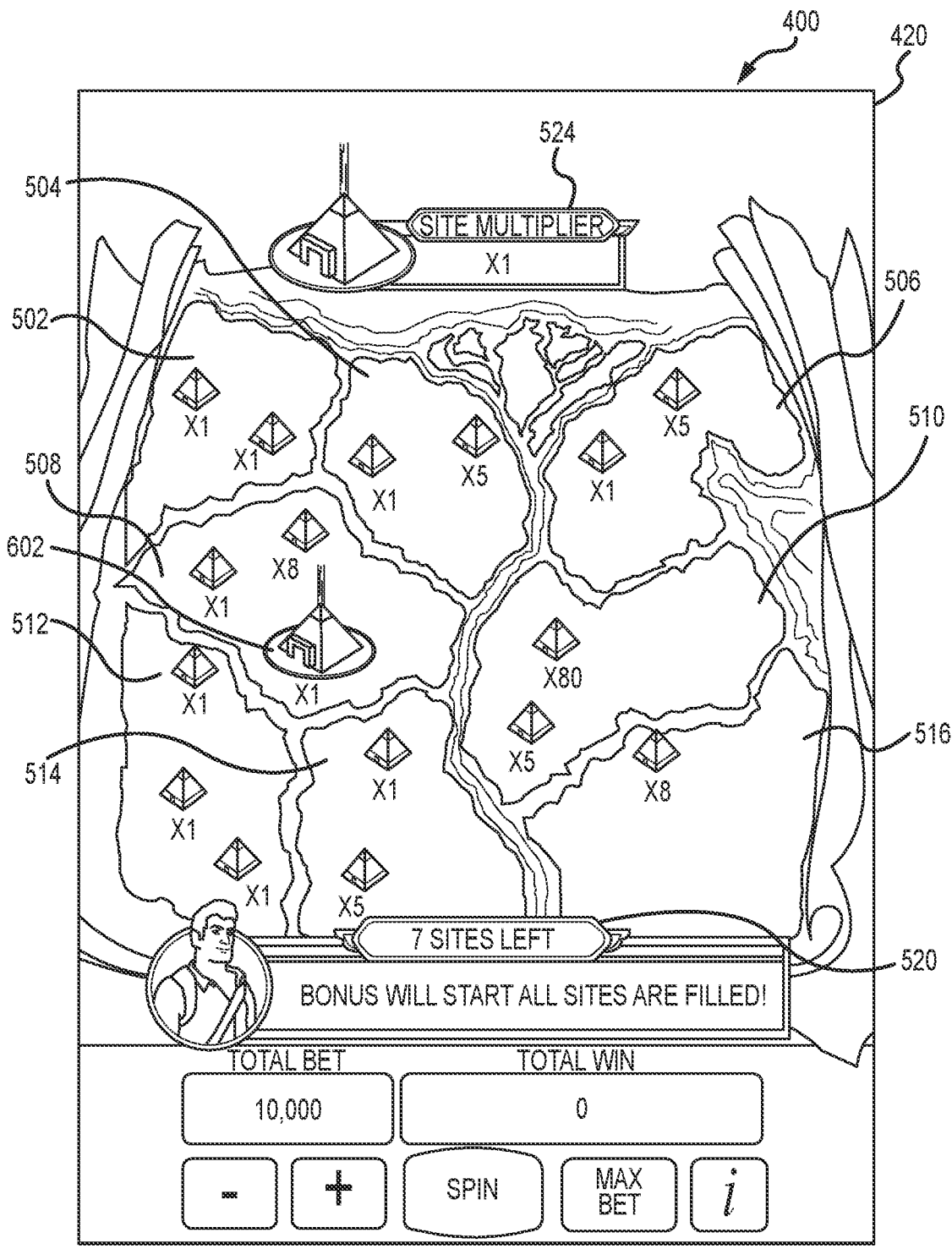
FIG. 6 is a screenshot of the map of the wagering game shown in FIG. 5, in which a claimable property icon displayed on the map is selected or claimed by a player.

FIG. 6 is a screenshot of wagering game 400, illustrating a claim by a player 412-418 of a claimable property icon 602 within region 508. As shown, when icon 602 is selected, the icon 602 is slightly enlarged and projects a beam of light from its apex to indicate that it has been newly selected. It will be appreciated that any suitable animation or graphical effect may be used to depict selection of claimable property icons. In addition, first meter 520 is decremented to indicate that there are "7 sites left" on map 420 capable of player selection, where the term "site" refers, during gameplay, to a claimable property icon.

Accordingly, to determine whether and when a bot player 414-418 will claim a claimable property icon, a processor (such as processor 204 and/or a processor of a mobile computing device, such as a smart phone or tablet, and/or a processor of a backend server system, such as any of server systems 106-114) may simulate a behavior of each bot 414-418 in a manner that resembles a behavior of one or more human players.

Broadly, to simulate bot behavior, as described below, a plurality of tables may be used, where each table defines as aspect of bot behavior to be applied during the bonus game. Further, the tables may include values defining characteristics of bot behavior (e.g., wager amounts, etc.) designed to approximate the behavior of different types of real-world players (e.g., high rollers, etc.)

For instance, in at least some embodiments, the tables described herein (e.g., tables 700-1024) may be determined based upon empirical data representing actual player behavior of one or more players during one or more actual (and/or observed) wagering games. In other words, the tables used to simulate bot behavior may not be arbitrary but empirically representative of actual player behavior. As a result, the bots described herein and simulated during wagering game 400 may "play" wagering game 400 in a way that approximates the play behavior of an actual (human) player. Stated another way, the bots described herein may play wagering game 400 in a way that "feels" real.

In addition, as described herein, in at least some embodiments, bot behaviors may also be simulated, such as in conjunction with the tables described herein, by a machine learning algorithm or artificial intelligence (AI). For example, the AI may begin with the tables (700-1024) as described herein, but may modify these tables over time based upon observations about actual player behavior. As a result, the AI may more closely simulate actual player behavior by the one or more bots introduced in wagering game 400 over time.

One specific improvement embodied by the present disclosure is therefore that one or more bots may be introduced in wagering game 400 to simulate actual player behavior. The specific manner in which this advantage is accomplished may vary, as described herein, but may in many embodiments, utilize one or more tables (e.g., tables 700-1024) defining bot behavior, as described herein. Further, these tables 700-1024 are specific in themselves and constitute specific and tailored data structures unique to the application described herein.

Accordingly, in the example embodiment, a plurality of bots 414-418 may be selected for use during the bonus game from a bot selection table. An example bot selection table 700 is shown with reference to FIG. 7A and 7B, where table 700 extends between both of FIG. 7A and 7B.

Example bot selection table 700 defines ten sets of bots (in the column labeled "Set #"). Each set of bots includes nine of a total number of twelve possible bots (using the columns labeled "$1^{st}$ bot"-"$9^{th}$ bot"). For instance, a first set of bots (or "bot set 1") includes bots 1, 2, 3, 4, 5, 6, 7, 8 and 9. Similarly, a fifth bot set includes bots 1, 3, 4, 5, 6, 7, 10, 11, and 12. Here, it may be noted that the number of bots in a set (nine) are greater than the number of bots 414-418 displayed in wagering game 400. In some cases, all nine bots may appear in wagering game 400. In other cases, only a subset of bots in a set that most recently selected claimable property icons (e.g., three bots 414-418) may be displayed, such as to conserve space within wagering game 400. In still other embodiments, the number of bots displayed in wagering game 400 may be varied using other criteria.

Table 700 further assigns a selection probability of each bot set (in the column labeled "Prob"). As used herein, this probability may be referred to as a "bot set selection probability." For instance, the first bot set is associated with a selection probability of 19.048%, and the fifth bot set is associated with a selection probability of 11.429%. The selection probabilities govern a probability that a particular bot set will be selected by the processor for use during a bonus game of wagering game 400.

In addition to the bot set selection probability described above, table 700 also assigns an individual probability to each bot within a given bot set. These probabilities may be referred to herein as "bot selection probabilities," and may govern a probability that a particular bot will be selected from a selected bot set to claim a property icon on map 420. In other words, once a bot set is selected using the bot set selection probability, a bot from the set is selected using the individual bot selection probabilities for that bot set.

To illustrate, if bot set 1 (including bots, 1, 2, 3, 4, 5, 6, 7, 8, and 9) is selected, a probability that bot 1 will be selected from bot set 1 to claim a particular claimable property icon is 100/587 (i.e., weight assigned to bot 1 divided by the total bot weight for bot set 1), or approximately 17%. In general terms, bot selection table 700 may thus be used to determine a set of bots that will participate in wagering game 400, and which bots from the set will be selected to participate.

In addition to selection of a bot set and bot(s), the processor may also determine whether a player is entering or playing wagering game 400 for the first time. Specifically, if the player has not placed any previous wagers or previously claimed icons on map 420, the processor may determine that the player is entering wagering game 400 for the first time.

In response to determining that the player is entering wagering game 400 for the first time, the processor may determine an initial number of property icons on map 420 to display as previously claimed by bots (e.g., bot players 414-418). This is to give the human player 412 the impression that they are joining wagering game 400 at a midpoint rather than in a pristine or initial state, in which no icons on map 420 have been claimed. It will be appreciated that this aspect may, in at least some embodiments, be omitted, whereby a player may enter wagering game 400 using a map 420 that does not include previously claimed icons (e.g., a "fresh" map).

Figure 8:
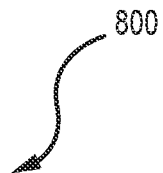
FIG. 8 shows a new initial entries table that may be used to determine a number of claimable property icons to be selected or claimed when a player initially enters the wagering game.

FIG. 8 illustrates a new initial entries table 800, which may be used to determine an initial number of property icons previously claimed on map 420 when human player 412 enters wagering game 400. In the example embodiment, new initial entries table 800 specifies up to five initial entries (e.g., in the column labeled "# Initial Entries") and associates each of the five initial entries with a weight (e.g., in the column labeled "Weight") and a probability of being selected for entry (e.g., in the column labeled "Prob"). Stated another way, table 800 specifies that zero initial entries (e.g., zero icons claimed when human player 412 first enters wagering game 400) is associated with a probability of 49.587%. Likewise, a probability that one icon will be claimed when human player 412 first enters wagering game 400 is 33.058%. The remaining initial entry probabilities are similarly specified.

Accordingly, when human player 412 enters wagering game 400 for the first time, the processor chooses an initial number of property icons on map 420 using new initial entries table 800. Each of these icons is then associated with a bot, such as any of bots 414-418, to indicate which bot 414-418 of the bot set selected using bot selection table 700 (as described above) has claimed each icon. More particularly, bots 414-418 are assigned to icons displayed during initial entry based upon the weighted bot selection performed with reference to table 700, as described above.

Further, in the example embodiment, once human player 412 has advanced beyond initial entry into wagering game 400 (e.g., after the player 412 places a subsequent wager), property icons may be selected by bot players 414-418 without reference to new initial entries table 800, as described in additional detail below.

Accordingly, in at least some embodiments, once the processor determines a subset of bots from bot selection table 700 (and/or places initial entries using new initial entries table 800, as described above), gameplay may proceed to selection of a time distribution for entry into wagering game 400 of each bot selected from the bot selection table 700. In other words, the processor may determine a time during wagering game 400 that a bot will claim a property icon if a player does not claim that property icon first.

FIG. 9 shows an example timed entry distribution table 900, which may be used to determine time points that bots will claim different property icons on map 420. In the example embodiment, timed entry distribution table 900 includes a plurality of time entry distributions (e.g., seven entry distributions, in the column labeled "#"). In addition, each time entry distribution is associated with a probability of being selected (e.g., the column labeled "Prob"), a minimum time entry point (e.g., in the column labeled "Min (sec)"), and a maximum time entry point (e.g., in the column labeled ("Max (sec)").

For example, a first time entry distribution may be selected 22.883% of the time and may be associated with a minimum time entry point of five seconds after a last property icon claim by a bot and a maximum time entry point of forty seconds after a last property icon claim by a bot. Likewise, a fourth time entry distribution may be associated with a probability of 16.476% (i.e., selected 16.476% of the time) and associated with a minimum time entry point of ten seconds after a last icon claim by a bot and a maximum time entry point of eighty-five seconds after a last icon claim by a bot.

In the example embodiment, the processor may therefore randomly create a set of time points based upon a selected time entry distribution. The number of time points created may be equal to a number of claimable property icons on map 420 (less the number of icons claimed based upon the new initial entries table determination described above).

To illustrate, if a first time entry distribution (having entry points between five and forty seconds) is selected, the processor may randomly generate time entry points for each bot using this distribution. As a result, a first bot may enter wagering game 400 after five seconds (e.g., an initial time, $t_0$, plus 5 seconds), a second bot may enter seven seconds after the after an icon claim by the first bot (e.g., $t_0$+5 seconds+7 seconds), and so on for each bot selected to participate, where each successive bot enters between five and forty seconds after an icon claim by a previous bot as a result of selection of the first time entry distribution from table 900.

In addition, for each of these created time points, the processor may (e.g., randomly) associate an unclaimed property icon with a single time point in a one-to-one relationship, and use the weighted bot selection, as described above with reference to bot selection table 700, to assign bots from bot selection table 700 to each of the time points and unclaimed property icons. In other words, the processor may generate a time point for each unclaimed property icon using table 900, and associate each icon/time point pair with a bot selected, as described above, using table 700.

In addition to the operations described above, the processor may also, in at least some embodiments, select a bet multiplier for each bot in the selected bot set. Specifically, the processor may refer to a bot bet multiplication table for the selected bot, as shown in FIG. 10.

Figure 10:
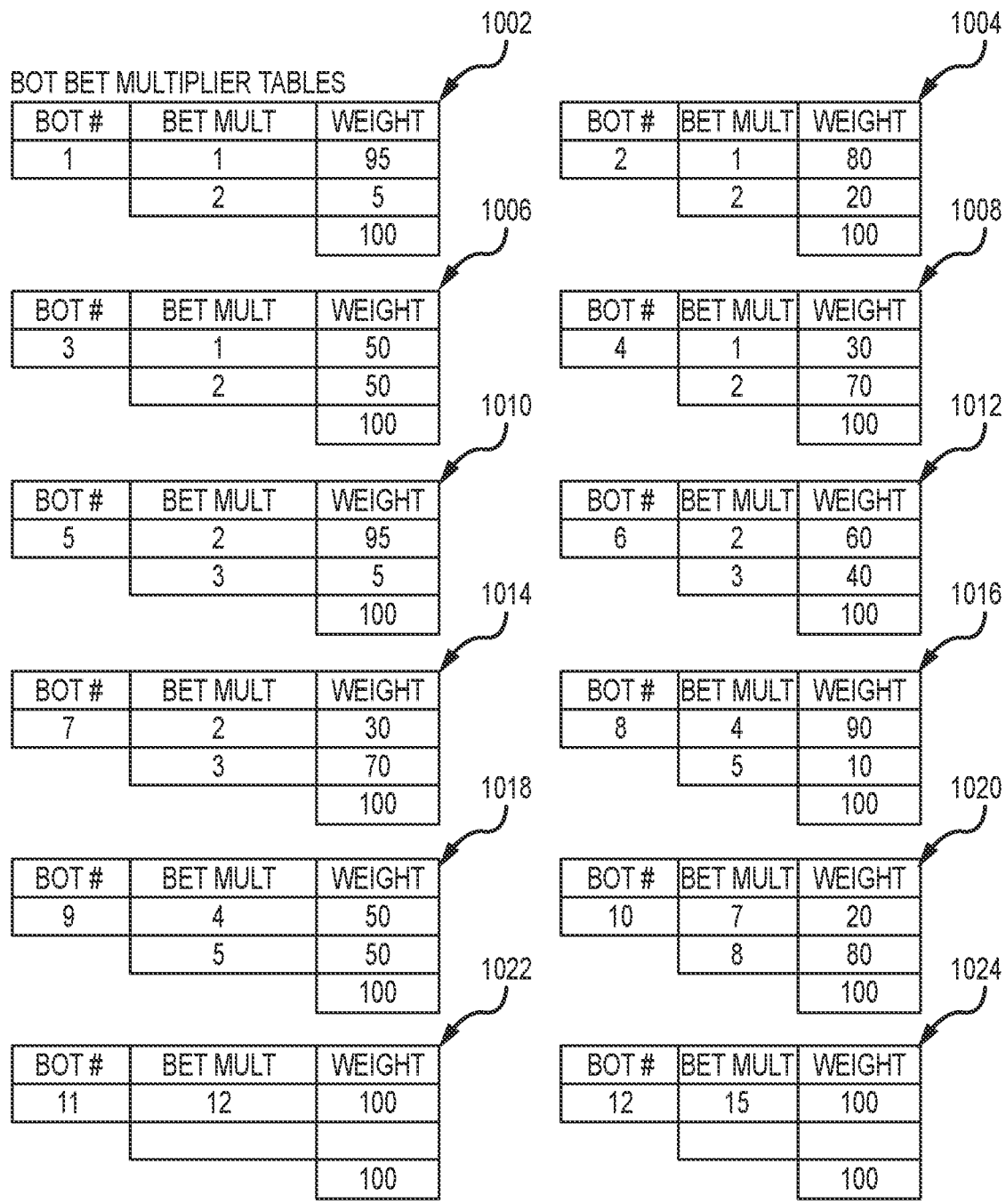
FIG. 10 shows a plurality of bot bet multiplier tables, each of which may be used to determine a bet multiplier associated with a bot selected to claim a property icon on the map.

FIG. 10 therefore illustrates a plurality of bot bet multiplication tables, each associated with one bot of the total number of bots, which in this example, is twelve bots. Accordingly, there are twelve bot bet multiplication tables.

These include a first bot bet multiplication table 1002 for a first bot (bot 1), a second bot bet multiplication table 1004 for a second bot (bot 2), a third bot bet multiplication table 1006 for a third bot (bot 3), and so on for all twelve bots. As a result, there are shown in FIG. 10, bot bet multiplication tables 1002-1024. Here, it will be appreciated that any suitable number of bot bet multiplication tables may be used, depending, for example, upon a total number of bots included in wagering game 400.

Each bot bet multiplier table includes a plurality of bet multipliers (e.g., in the column labeled "Bet Mult."), and each bet multiplier is associated with a weight (e.g., in the column labeled "Weight"). For example, table 1002 (associated with bot 1) includes a bet multiplier of "1" or "x1" having a weight of 95%, and a second bet multiplier of "2" of "x2" having a weight of 5%. In other words, a bet multiplier of "x1," corresponding to a multiplication factor of unity, has a probability of being associated with bot 1 (when bot 1 is selected) 95% of the time, while a bet multiplier of "x2," corresponding to a multiplication factor of two (or times two) has a probability of being associated with bot 15% of the time. Tables 1004-1024 are similarly constructed.

Bot bet multiplier tables 1002-1024 may therefore be used to determine how much a claimable property icon is "worth" to a bot selecting the icon, in that second meter 524 (the "site multiplier" described above) may be adjusted to reflect the bot bet multiplier, which is associated with a property icon claimed by the bot during play of wagering game 400. Stated another way, the bot bet multiplier selected by the processor from a bot bet multiplier table 1002-1024 is displayed in second meter 524 and applied to a claimable property icon selected by the bot for use in determining an award.

Accordingly, and to summarize briefly, during wagering game 400, a subset of bots, such as bots 414-418, may be selected from bot selection table 700. Next, if a human player, such as human player 412, is entering wagering game 400 for the first time, a number of initial icons to be displayed as previously claimed may be determined using new initial entries table 800 and the weighted bot selection performed with reference to bot selection table 700.

Further, a plurality of time points equal to a number of icons on map 420 (minus the initial entries) may be generated using timed entry distribution table 900, and each of the unclaimed icons on map 420 may be associated with one of the time points from the plurality of time points. In addition, the weighted bot selection performed using bot selection table 700 may again be used to determine which bots to assign to each icon/time point pair, and a bet multiplier may be assigned to each icon as well using bet multiplier tables 1002-1024.

Wagering game 400 may therefore simulate a behavior of a plurality of bots, such as bots 414-418, in a manner that resembles a behavior of one or more human players. In at least some embodiments, bot behavior may be simulated using a plurality of tables, where each table defines an aspect of bot behavior to be applied during wagering game 400. Further, the tables may include values defining characteristics of bot behavior (e.g., multipliers, which may reflect simulated wager amounts, etc.) designed to approximate the behavior of different types of real-world players (e.g., high rollers, etc.) Further, in at least some embodiments, the values provided in each table and used to simulate bot behavior may be adjusted in real time (e.g., by a casino operator) to reflect or simulate actual player behaviors within a casino. Likewise, in at least one embodiment, an artificial intelligence (AI) or machine learning algorithm may analyze player data in real time within a casino and adjust values within one or more of the tables used to simulate bot behavior to better approximate actual player behavior.

Figure 11:
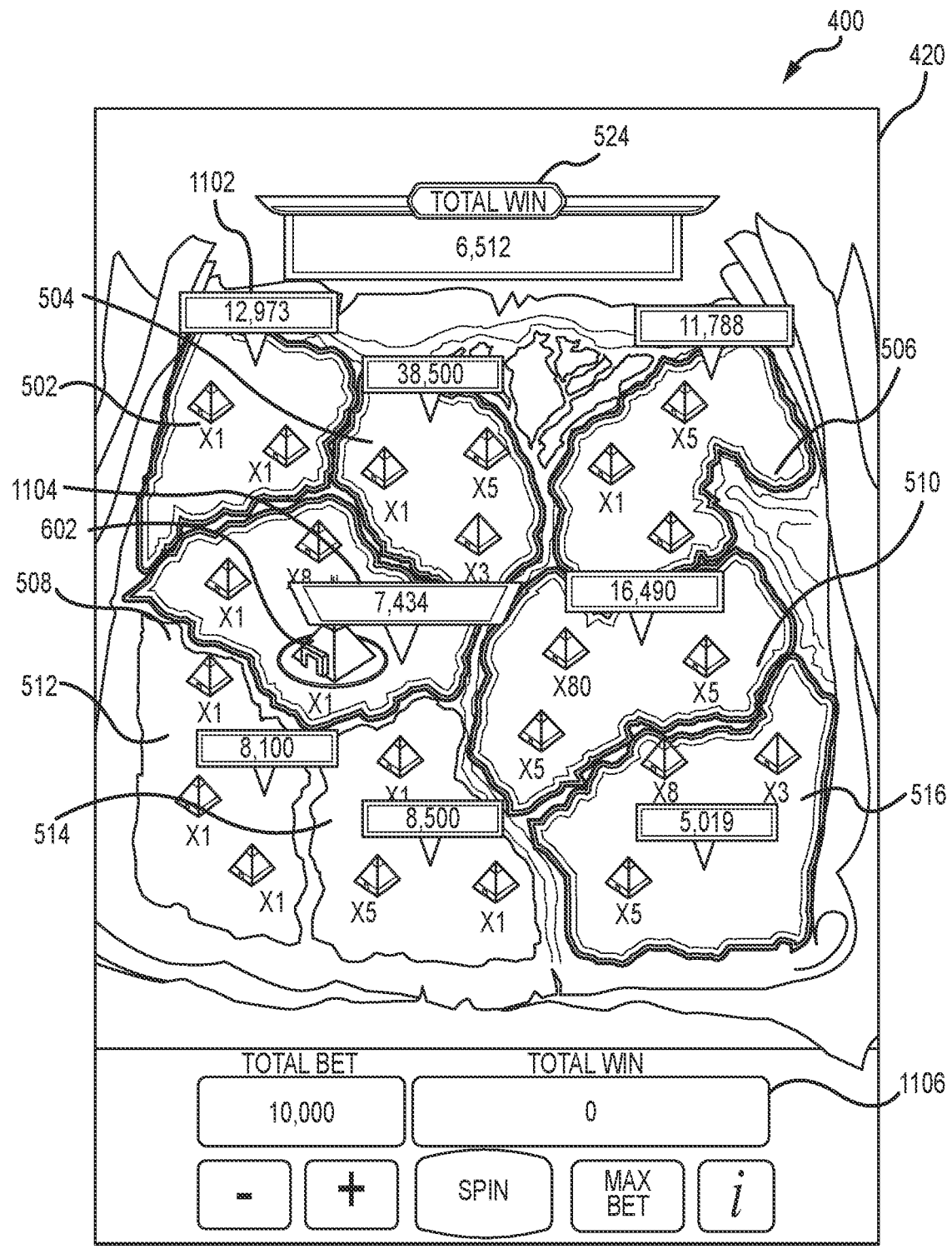
FIG. 11 is a screenshot of the map of the wagering game shown in FIG. 5, in which awards are displayed in association with one or more regions of the map.

FIG. 11 is a screenshot of wagering game 400, in which an award is determined in response to all of the claimable property icons included on map 420 being claimed by human player 412 and/or bot players 414-418. Specifically, in at least the example embodiment, a process of determining an award to provide to human player 412 is performed in response to all property icons being claimed. In another embodiment, this process may be performed each time all property icons within a region 502-516 are claimed.

Accordingly, in the example embodiment, an award value is calculated for each region 502-516. The award value for each region 502-516 may be based upon a variety of factors (e.g., player wagers placed during wagering game 400) and/or predefined for each region 502-516. In both cases, an award meter is displayed above each region to indicate the award value associated with each region. For example, an award meter 1102 is displayed above region 502 and shows an award value associated with region 502 of 12,973 credits. Similarly, an award meter 1104 above region 508 shows an award value of 7,434 credits. The other regions 504-506 and 510-516 include similar award meters.

To determine an award to provide to human player 412, each region 502-516 in which player 412 has claimed an icon is identified, and a value associated with each of these icons is applied to the award value displayed in the award meter above the region 502-516 and provided to player 412. In various embodiments, a multiplier associated with each icon claimed by player 412 is also factored into the award calculation for each region, such as, for example, by multiplying the award value displayed above the region 502-516 by the multiplier associated with one or more icons claimed by player 412 within the region 502-516. Finally, the portion of the award for each region credited to player 412 is aggregated to calculate a total award for player 412, and the aggregated value added to a credit meter 1106 of player 412.

Figure 12:
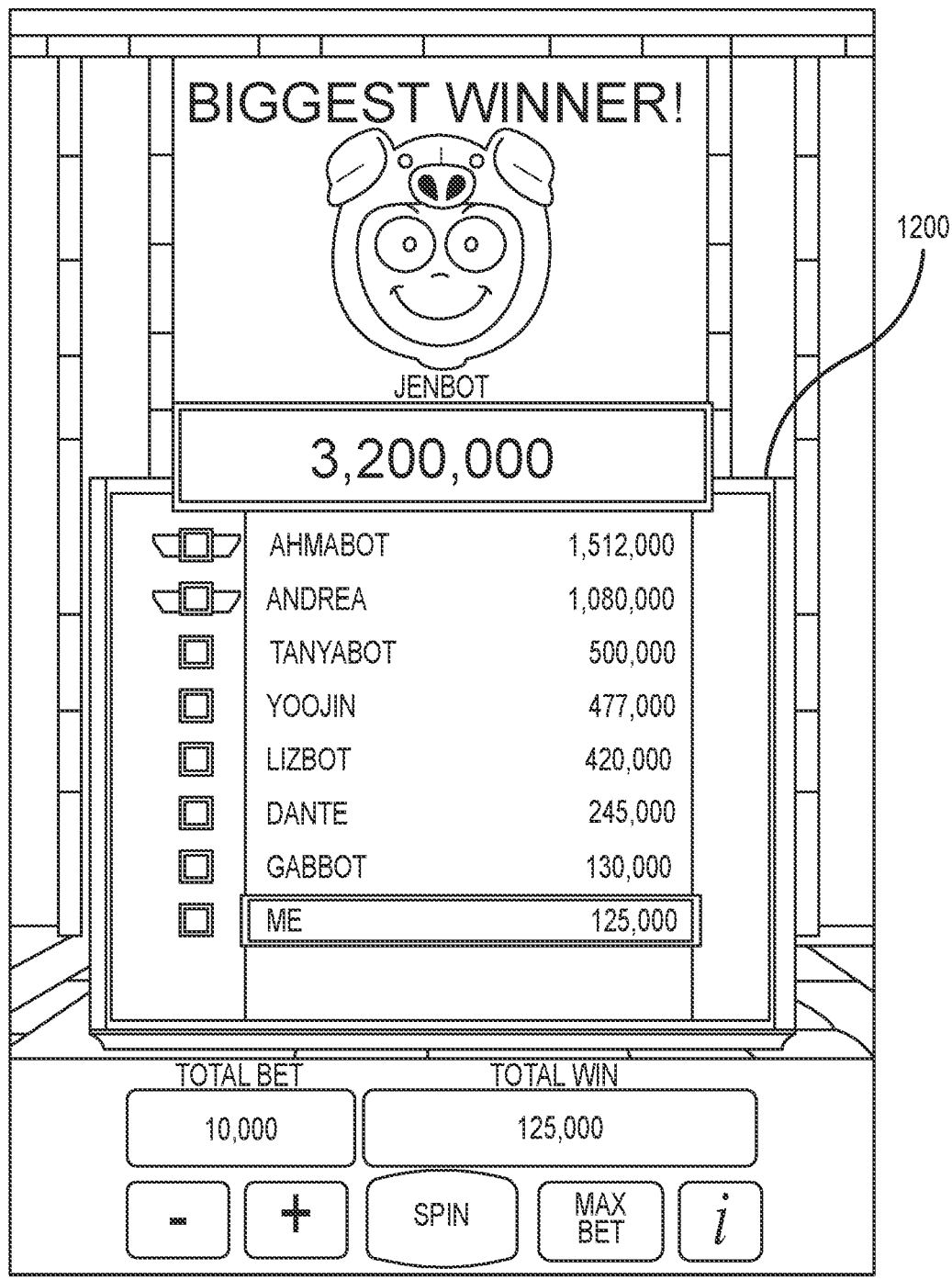
FIG. 12 is a screenshot of a leaderboard of the wagering game shown in FIG. 4.

In some embodiments, this process is also performed for each bot player 414-418, although bot players 414-418 may not in actuality be provided the awards. Rather, once a total award is calculated for each player 412-418, a leaderboard may be displayed to indicate a relative standing of each player 412-418. FIG. 12 illustrates such a leaderboard 1200.

Figure 13:
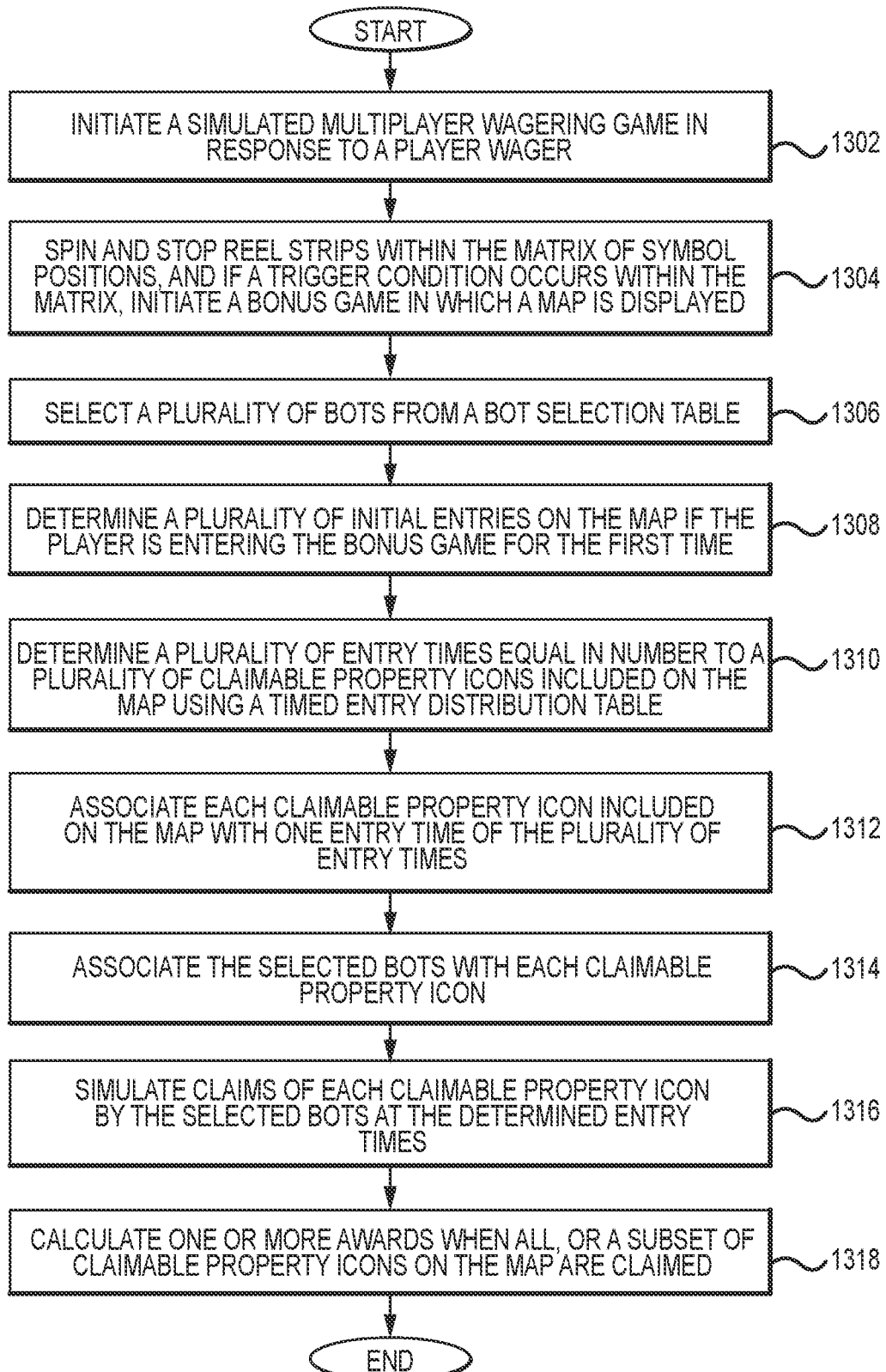
FIG. 13 is a flowchart illustrating a process for playing the simulated multiplayer wagering game shown in the other figures.

FIG. 13 is a flowchart illustrating and summarizing a process for simulating multiplayer wagering game 400 using a plurality of bots, such as bots 414-418. Accordingly, in the example embodiment, simulated multiplayer wagering game 400 may be initiated, such as in response to a player wager (step 1302). Reel strips may be spun and stopped within matrix 402 and evaluated, and if a trigger condition is satisfied, map 420 may be displayed as part of a bonus game (step 1304). As described herein, map 420 includes a plurality of claimable property icons enclosed by a plurality of regions 502-516.

Further, in the example embodiment, a plurality of bots may be selected from bot selection table 700 (step 1306), and if player 412 is entering wagering game 400 for the first time, a plurality of initial entries (or icons previously claimed by bots) may be determined using new initial entries table 800 (step 1308). As the player views map 420 for the first time, the property icons initially or previously claimed by one or more bots (if any) may be indicated on map 420. In addition, the player may be allowed to claim one or more property icons on map 420 by selecting a region and/or property icon.

Next, in at least some embodiments, a plurality of entry times equal in number to the plurality of claimable property icons (minus those occupied or claimed as initial entries) may be determined using timed entry distribution table 900 (step 1310). Each claimable property icon on map 420 may, in addition, be associated with each entry time of the plurality of entry times in a one-to-one relationship, such that each icon is associated with one of the determined entry times (step 1312). Further, in the example embodiment, bots selected at step 1306 may also be associated with each property icon (e.g., in a one-to-one or one-to-many relationship), whereby each claimable property icon (again, less those displayed as initial entries) is linked to a respective bot having a respective entry time (step 1314).

As gameplay continues, claims of each claimable property icon may be simulated to occur by each bot at the entry time associated with each icon and each bot, as described herein (step 1316). In addition, in the example embodiment, once all claimable property icons on map 420 (or within a region 502-516) are claimed, one or more awards may be calculated and/or provided to a player of wagering game 400 (step 1318).

Embodiments of the present disclosure thus provide systems and methods for introducing a plurality of simulated players, or "bots," during an electronic wagering game. Bot behaviors are simulated to approximate actual player behavior. For example, one or more tables that define different aspects of bot behavior may be used during the wagering game to determine a behavior of each bot. Thus, for example, if a player wants to play a multiplayer game but no other players are available, the system of the present invention allows a player to play a simulated multiplayer wagering game without actually engaging in a multiplayer wagering game played by a plurality of human players. Rather, one or more bots may be introduced to simulate player behavior and to simulate a multiplayer wagering game.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A tangible, non-transitory, computer-readable storage medium having instructions stored thereon, which when executed by a processor, cause the processor to at least:
   initiate a multiplayer game;
   control a display device to display a plurality of selectable items;
   select at least one bot from a plurality of bots from a bot selection table, each bot of the plurality of bots simulating a player behavior, wherein the bot selection table includes a bot selection weight associated with each bot of the plurality of bots;
   determine an entry time for at least one bot of the plurality of bots in the multiplayer game; and
   control the display device to simulate a selection, by the at least one bot, of at least one selectable item at the determined entry time.

2. The computer-readable storage medium of claim 1, wherein the entry time is determined based upon a timed entry distribution table.

3. The computer-readable storage medium of claim 1, wherein the instructions, when executed, further cause the processor to at least select the at least one bot based on a bot selection probability associated with each bot of the plurality of bots.

4. The computer-readable storage medium of claim 1, wherein the instructions, when executed, further cause the processor to, simulate a behavior of the at least one bot based on a bot behavior table comprising values defining characteristics of bot behavior.

5. The computer-readable storage medium of claim 4, wherein the values comprising characteristics of bot behavior include values that approximate the behavior of different types of real-world players.

6. The computer-readable storage medium of claim 1, wherein the instructions, when executed, further cause the processor to at least control the display device to display an initial number of the selectable items based upon an initial entries table comprising entries associated with previously claimed selectable items.

7. A method comprising:
   initiating, by a processor, a multiplayer game;
   controlling, by the processor, a display device to display a plurality of selectable items;
   selecting, by the processor, at least one bot of a plurality of bots from a bot selection table associated with each bot of the plurality of bots, each bot simulating a player behavior, wherein the bot selection table includes a bot selection weight associated with each bot of the plurality of bots;
   determining, by the processor, an entry time for at least one bot of the plurality of bots in the multiplayer game; and
   controlling, by the processor, the display device to simulate a selection, by the at least one bot, of at least one selectable item at the determined entry time.

8. The method of claim 7, wherein the entry time is determined based upon a timed entry distribution table.

9. The method of claim 7, further comprising selecting the at least one bot based on a bot selection probability associated with each bot of the plurality of bots.

10. The method of claim 7, further comprising displaying a simulated behavior of the at least one bot based on a bot behavior table comprising values defining characteristics of bot behavior.

11. The method of claim 10, wherein the values comprising characteristics of bot behavior include values that approximate the behavior of different types of real-world players.

12. The method of claim 7, further comprising displaying on the display device an initial number of the selectable items based upon an initial entries table comprising entries associated with previously claimed selectable items.

13. An electronic gaming machine comprising:
   a display device;
   a processor configured to execute instructions stored in a memory, which when executed, cause the processor to at least:
   initiate a multiplayer game;
   select at least one bot of a plurality of bots from a bot selection table associated with each bot of the plurality of bots, each bot simulating a player behavior, wherein the bot selection table includes a bot selection weight associated with each bot of the plurality of bots;
   determine an entry time for at least one bot of the plurality of bots in the multiplayer game; and
   control the display device to simulate a selection, by the at least one bot, of at least one selectable item at the determined entry time.

14. The electronic gaming machine of claim 13, wherein the entry time is determined based upon a timed entry distribution table.

15. The electronic gaming machine of claim 13, the instructions further causing the processor to select the at least one bot based on a bot selection probability associated with each bot of the plurality of bots.

16. The electronic gaming machine of claim 13, the instructions further causing the processor to initiate displaying a simulated behavior of the at least one bot based on a bot behavior table comprising values defining characteristics of bot behavior.

17. The electronic gaming machine of claim 16, wherein the values comprising characteristics of bot behavior include values that approximate the behavior of different types of real-world players.

\* \* \* \* \*